United States Patent
Guim Bernat et al.

(10) Patent No.: US 10,402,124 B2
(45) Date of Patent: Sep. 3, 2019

(54) DYNAMICALLY COMPOSABLE COMPUTING SYSTEM, A DATA CENTER, AND METHOD FOR DYNAMICALLY COMPOSING A COMPUTING SYSTEM

(71) Applicant: Intel Corporation, Santa Clara, CA (US)

(72) Inventors: Francesc Guim Bernat, Barcelona (ES); Mark Schmisseur, Phoenix, AZ (US); Karthik Kumar, Chandler, AZ (US); Thomas Willhalm, Sandhausen (DE); Lidia Warnes, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 15/474,044

(22) Filed: Mar. 30, 2017

(65) Prior Publication Data
US 2018/0284996 A1 Oct. 4, 2018

(51) Int. Cl.
*G06F 3/06* (2006.01)
*G06F 9/50* (2006.01)

(52) U.S. Cl.
CPC ............ *G06F 3/067* (2013.01); *G06F 3/0605* (2013.01); *G06F 3/0631* (2013.01); *G06F 9/50* (2013.01)

(58) Field of Classification Search
CPC ...... G06F 3/0605; G06F 3/0631; G06F 3/067; G06F 9/50
See application file for complete search history.

(56) References Cited

U.S. PATENT DOCUMENTS

| | | | |
|---|---|---|---|
| 2014/0136710 A1* | 5/2014 | Benari | G06F 9/5044 709/226 |
| 2016/0055119 A1* | 2/2016 | Egi | G06F 15/17331 710/313 |
| 2017/0054603 A1* | 2/2017 | Kulkarni | G06F 9/5077 |
| 2017/0293447 A1* | 10/2017 | Bivens | G06F 3/0619 |
| 2018/0077235 A1* | 3/2018 | Nachimuthu | G06F 3/06 |

* cited by examiner

*Primary Examiner* — Aracelis Ruiz
(74) *Attorney, Agent, or Firm* — 2SPL Patent Attorneys PartG mbB

(57) ABSTRACT

The present disclosure relates to a dynamically composable computing system. The dynamically composable computing system comprises at least one compute sled including a set of respective local computing hardware resources; a plurality of disaggregated memory modules; at least one disaggregated memory acceleration logic configured to perform one or more predefined computations on data stored in one or more of the plurality of disaggregated memory modules; and a resource manager module configured to assemble a composite computing node by associating, in accordance with requirements of a user, at least one of the plurality of disaggregated memory modules with the disaggregated memory acceleration logic to provide at least one accelerated disaggregated memory module and connecting the least one accelerated disaggregated memory module to the compute sled.

25 Claims, 12 Drawing Sheets

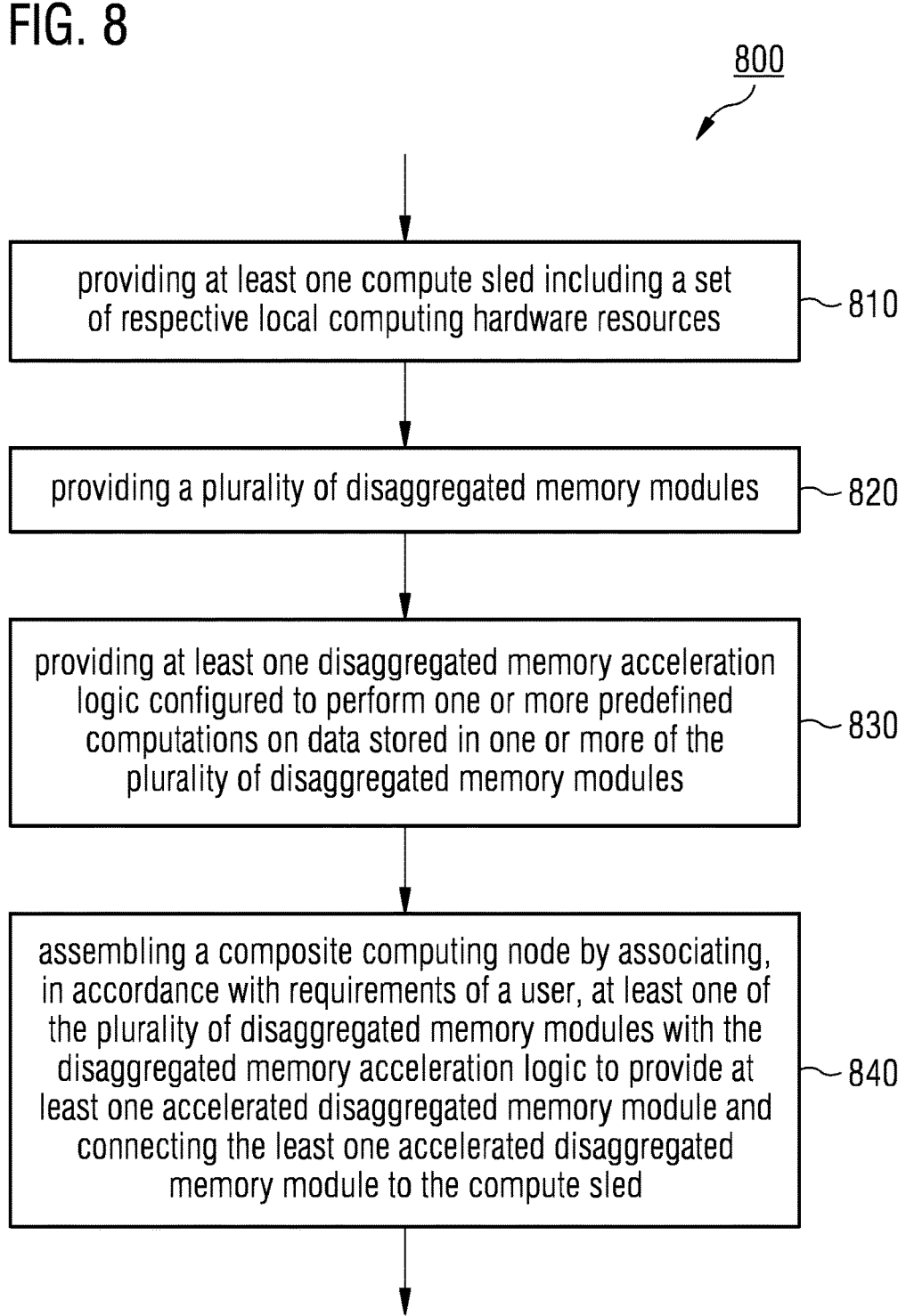

DYNAMICALLY COMPOSABLE COMPUTING SYSTEM, A DATA CENTER, AND METHOD FOR DYNAMICALLY COMPOSING A COMPUTING SYSTEM

FIELD

The present disclosure generally relates to configurable and/or composable computing resources and more particularly to accelerated memory in composable architectures.

BACKGROUND

Software defined infrastructure (SDI) is a technological advancement that enables new ways to operate a shared pool of configurable computing resources deployed for use in a data center or as part of a cloud infrastructure. SDI may allow individual elements of a system of configurable computing resources to be composed with software. These elements may include disaggregate physical elements (hardware) such as central processing units (CPUs), memory, network input/output devices or storage devices. The elements may also include composed elements that may include various quantities or combinations of physical elements composed to form logical servers that may then support virtual elements arranged to implement service/workload elements.

The virtual elements of the SDI can be ordered to form a service chain. In general, each virtual element of the service chain will have differing performance limitations. As a result, a virtual element can become a bottleneck in the overall performance of the service chain.

BRIEF DESCRIPTION OF THE DRAWINGS

Some examples of apparatuses and/or methods will be described in the following by way of example only, and with reference to the accompanying figures, in which

FIG. 8 shows a schematic flowchart a method for dynamically composing a computing system;

DESCRIPTION OF EMBODIMENTS

Figure 1:
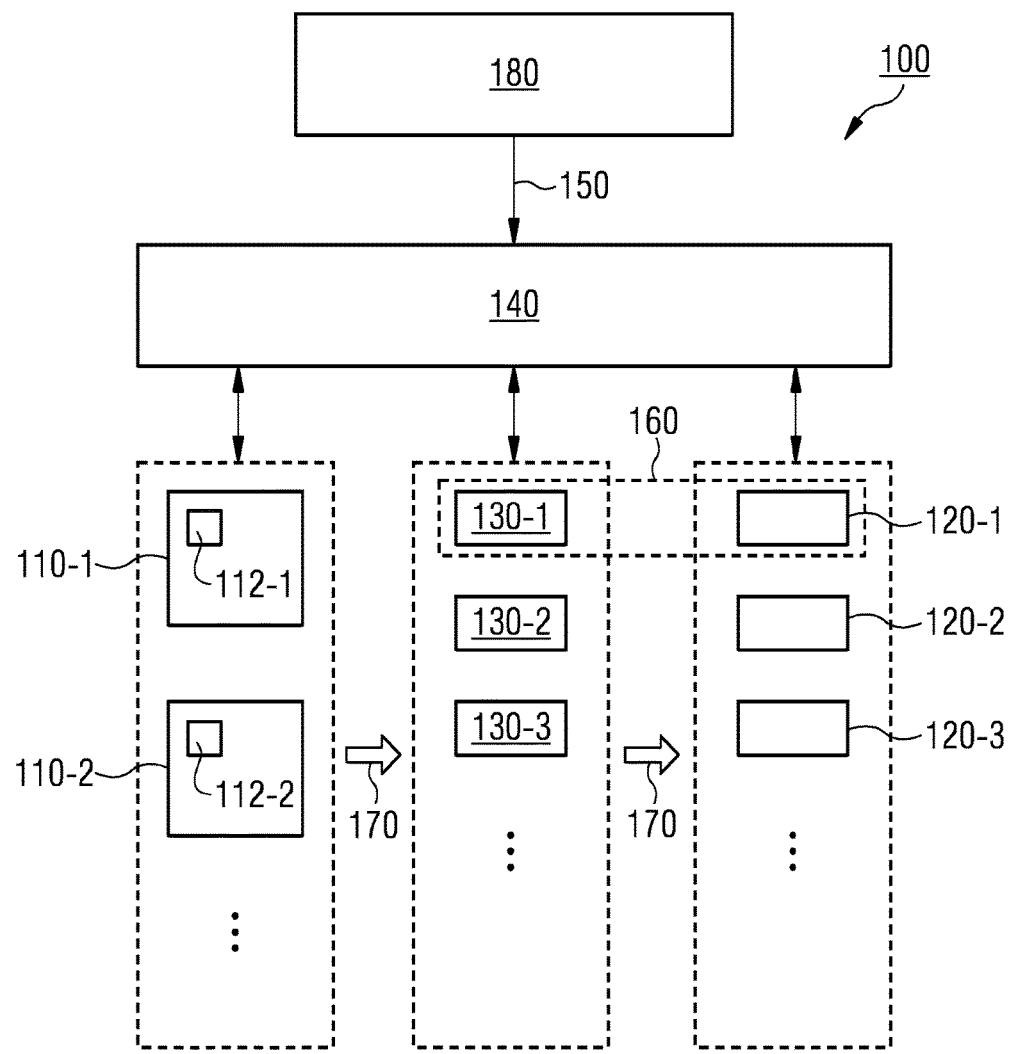
FIG. 1 shows a block diagram of a dynamically composable computing system according to an example.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Over the last decade, huge growth in demand for Internet and mobile services has driven rapid transformation in digital businesses. This growth has been highly disruptive; it has created new business opportunities, and challenged the status quo. In data centers, two forces have created much of this change: the evolution of virtualization and the rise of cloud computing. However these forces represent only two of the three key elements that will drive competitive advantage going forward. The third element and missing piece is a flexible computing, storage, and network fabric that will usher in an age of truly agile digital infrastructure. Virtualization has set the stage for agile infrastructure. It has enabled elastic horizontal scaling, planted the seeds for cloud computing, and created new standard units of computing, such as virtual machines, which could be installed on one server or span many. The growth in virtualization has been complemented by the expansion of various flavors of cloud computing infrastructure services: infrastructure as a service, platform as a service, and the most prevalent form, software as a service. By creating the potential for massive scalability, cloud computing has created new business models and changed the context for existing ones. Businesses are counting on the cloud not simply for lower total cost of ownership, but also greater return on investment, as they increasingly try to use the flexibility of the cloud for business advantage reaching their users anywhere in the world and accelerating their ability to evolve to meet customer needs.

However, today's infrastructure does not effectively deal with the complexity of managing increasingly large numbers of computing resources that might reside anywhere in the world, nor does it help address the need for rapid change and the introduction of new product features and capabilities. This brings the need of adding software abstraction layers on top in order to scale and adapt the architecture to the needs of the moment. Traditional data center architectures include set of different heterogeneous or homogenous platforms (also referenced as compute nodes or servers) that are statically composed by a set of local resources (such as compute, memory, storage, computing fabric or accelerators) and may have access to disaggregated resource (such as storage or accelerators) over the computing fabric. One of the main advantages that these architectures provide is the ease of maintenance and manageability. However, they lack of adaptability, configurability and extensibility. As has been already mentioned, most of data centers requirements and workloads evolved during the last decades having a much larger variety of needs, characteristics and dynamicity. To satisfy these new requirements, SDI architectures may provide mechanisms that allow to dynamically create a platform where applications may be executed.

As contemplated in the present disclosure, various applications or workloads can be executed using a shared pool of configurable resources, such as, computing hardware resources of a data center. These workloads can be implemented using software-defined infrastructure (SDI), software defined network (SDN), or other virtualization techniques. In general, the present disclosure provides processes and apparatuses to manage computing hardware resource allocation for these various workloads. For example, the present disclosure provides a controller configured to allocate computing hardware resources having respective hardware characteristics that meet predefined (hardware) requirements of a workload to be executed on an assembled composite computing node. Examples of the present disclosure may allocate cache space (e.g., level 3 (L3) cache, or the like), memory bandwidth, and/or input and output (I/O) bandwidth to various workloads. In some examples, the controller may allocate such resources based on performance requirements and/or relative priority of the workloads. Such performance goals and/or workload priority can be specified, for example, by a service level agreement (SLA), or the like.

Examples of the present disclosure provide management and allocation of shared computing resources at a "fine-grained" level as compared to present techniques. As such, examples of the present disclosure may enable higher consolidation density of workloads, better management of resources to meet performance goals, and better management on a per workload (e.g., process flow, virtual machine (VM), virtual network function (VNF), container, etc.) basis. In particular, the present disclosure provides management or resource allocation on a per workload basis as opposed to limiting the number of workloads per platform, or limiting resource usage per workload.

In some examples, a controller can be configured to allocate resources, adjust a resource allocation, rebalance resource allocations, and/or migrate service chains to another server or portion of configurable computing resources. The controller may be configured to receive a policy to include indications of hardware requirements for a number of service chains. The controller may also be configured to receive performance information to include indications of the performance of the service chains and to adjust resource allocation based on the received policy, hardware requirements, and the relative priority between the service chains.

FIG. 1 illustrates an example of a dynamically composable or configurable computing system 100 according to the present disclosure.

The dynamically composable computing system 100 comprises at least one compute sled 110. The illustrated example shows a first compute sled 110-1 and a second compute sled 110-2. The skilled person having benefit from the present disclosure will appreciate however that an arbitrary number of compute sleds may be foreseen. Each compute sled 110 comprises a set of respective local computing hardware resources 112 being local to or housed by the compute sled.

The dynamically composable computing system 100 further comprises one or more disaggregated memory modules 120. The illustrated example shows a first disaggregated memory module 120-1, a second disaggregated memory module 120-2 and a third disaggregated memory module 120-3. The skilled person having benefit from the present disclosure will appreciate however that an arbitrary number of disaggregated memory modules may be foreseen.

The dynamically composable computing system 100 further comprises at least one memory acceleration logic 130, which may be disaggregated or even local to the compute sled 110. The illustrated example shows a first disaggregated memory acceleration logic 130-1, a second disaggregated memory acceleration logic 130-2 and a third disaggregated memory acceleration logic 130-3. The skilled person having benefit from the present disclosure will appreciate however that an arbitrary number of (disaggregated) memory acceleration logics may be foreseen. Each memory acceleration logic 130 is configured to perform one or more respective predefined computations on data stored in one or more of the plurality of disaggregated memory modules 120.

The dynamically composable computing system 100 further comprises a resource manager module 140 which is configured to assemble a composite or virtual computing node from the different disaggregated hardware resources 110, 120, 130. The composite computing node is assembled by associating or allocating, in accordance with requirements 150 of a user or an application (workflow) to be executed on the composite computing node, at least one of the plurality of disaggregated memory modules 120 with the at least one memory acceleration logic 130 in order to provide at least one accelerated disaggregated memory module 160 and by connecting the least one accelerated disaggregated memory module 160 to the compute sled 110.

The skilled person having benefit from the present disclosure will appreciate that the dynamically configurable computing system 100 can, in addition to compute sled 110, disaggregated memory modules 120, and the at least one memory acceleration logic 130, include more disaggregate computing hardware resources that can be used for composing the composite computing node, such as network (NW) input/outputs (I/Os). NW I/Os may include network interface cards (NICs) having one or more NW ports w/associated media access control (MAC) functionality for network connections within system 100 or external to system 100. Disaggregate computing hardware resources may also include NW switches. NW switches may be capable of routing data via either internal or external network links for elements of system 100.

In the illustrated example, it can be assumed that local CPUs are hosted in minimal platform form factors with some local hardware resources named compute sled 110. Thus, in the illustrated example, the dynamically assembled composite node comprises at least one compute sled 110 including a (minimum) set of local computing hardware resources 112, such as one or more local CPUs and optionally one or more local memory modules or chips. However, in another example the CPUs could be pooled as well as part of another hardware resource pool. The resource manager module 140 can be configured to connect the compute sled 110 to the selected disaggregated hardware resources 120, 130 through a computing fabric 170.

The disaggregated memory modules 120 may represent various types of memory or storage devices including volatile types of memory such as, but not limited to, random access memory (RAM), dynamic RAM (DRAM), double data rate synchronous dynamic RAM (DDR SDRAM), static random-access memory (SRAM), thyristor RAM (TRAM) or zero-capacitor RAM (ZRAM) and/or including non-volatile types of memory such as, but not limited to, 3-dimensional (3D) cross-point memory that may be byte or block addressable. Byte or block addressable non-volatile types of memory may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above, or other non-volatile memory types. These various types of memory or storage devices may be included in dual in-line memory modules (DIMMs) or other configurations such as Hard Disk Drives (HDDs) configurations or Solid State Drives (SSDs) configurations.

The at least one memory acceleration logic 130 can be a programmable hardware device, such as a field programmable gate array (FPGA), for example. It can be programmed to perform computations on and/or manipulations of data stored in one or more of the plurality of disaggregated memory modules 120. For this purpose, the memory acceleration logic 130 may include integrated memory or storage configured to store program code implementing the one or more predefined computations. In some examples, the memory acceleration logic 130 can be configured to fetch data from one or more associated disaggregated memory modules 120, to perform one or more predefined computations or manipulations using the fetched data, and to provide a result of the one or more predefined computations or manipulations to the user and/or write it back to the associated disaggregated memory modules 120. Examples of such computations/manipulations (also referred to as memory operations) include searching a dataset for a given element (which is massively data parallel, and is an operation that should be pushed to data to take advantage of the data parallelism), computing page level checksums (useful for persistent memory, to make sure data on a remote node is indeed what the application expects it to be, by comparing with an existing precomputed set of checksums), zeroing out pages, etc. That is to say, the disaggregated memory acceleration logic 130 can take over tasks which would normally have to be performed by the local CPUs or cores of the compute sled 110.

The compute sled 110, the memory modules 120, and the memory acceleration logic 130 forming the composite computing node may all be respective disaggregated hardware resources, meaning that they do not need to be provided on the same substrate (e.g., a printed circuit board, (PCB)), but may be located remotely from each other in a data center. Thus, in some examples, the plurality of disaggregated memory modules 120 can be located remotely from the at least one compute sled 110 in a data center. Likewise, the at least one memory acceleration logic 130 can be located remotely (disaggregate) from the at least one compute sled 110 in a data center. To be more precise, the plurality of disaggregated memory modules 120 can be located in a different rack drawer or rack (frame or enclosure for mounting multiple electronic equipment modules) than the at least one compute sled 110. Likewise, the at least one disaggregated memory acceleration logic 130 can be located in a different rack drawer or rack of a data center than the at least one compute sled 110.

In order to reduce latency, the skilled person having benefit from the present disclosure will appreciate that it may be beneficial to place the at least one memory acceleration logic 130 as close as possible to the plurality of disaggregated memory modules 120. Thus, in some examples, one or more of the plurality of disaggregated memory modules 120 associated with the at least one memory acceleration logic 130 may be located in the same rack drawer or rack as the at least one memory acceleration logic 130. In other examples, one or more of the plurality of disaggregated memory modules 120 and the at least one memory acceleration logic 130 may even be integrated on the same substrate (e.g., a PCB or a semiconductor substrate), which will be explained in more detail further below.

In some examples, the resource manager module 140 may be arranged to manage or control at least some aspects of the disaggregate computing hardware resources 120, 130 of composite computing nodes. The resource manager module 140, which may also be referred to as an SDI-Manager, can be implemented by software, hardware, or some combination of the two. In some examples, it can be a hardware component of a data center. As such, it can comprise computer hardware components, such as CPUs, memory devices, storage devices, I/O devices, display devices, etc. In some examples, the resource manager module 140 is configured as a programmable hardware device, such as a digital signal processor (DSP) or FPGA. The resource manager module 140 can provide for the sharing of the disaggregate computing hardware resources and composite computing nodes among different applications or workloads. For example, the resource manager module 140 may be configured to coordinate the sharing of hardware resources in the system 100 (e.g., cache space, memory bandwidth, I/O bandwidth, or the like) between various ones of the applications based on the relative priority of these applications.

The resource manager module 140 can be configured to receive workload requirements 150 for the workloads or applications supported by the system 100 and coordinate the sharing of hardware resources between these workloads based on these workload requirements. The workload requirements 150 can be provided by an orchestrator 180 aligning a business request with applications, data, and infrastructure. The orchestrator 180 may define policies and service levels through automated workflows, provisioning, and change management. This creates an application-aligned infrastructure that can be scaled up or down based on the needs of each application. For example, the resource manager module 140 can be configured to allocate (or adjust an allocation) of a portion of the shared pool of configurable resources (e.g., the disaggregate computing hardware resources) for any number of the workload elements. Additionally, the resource manager module 140 can be configured to relocate workload elements from one composite computing node or logical server to another if workload hardware requirements change.

The resource manager module 140 can be configured to coordinate this sharing of resources based on workload requirements (e.g. hardware requirements) of the workload elements and, alternatively or additionally, an indication of the relative priority between the workload elements. However, it is worthy to note, that the resource manager module 140 can further be configured to coordinate sharing based on increasing throughput, decreasing latency, or the like. As such, the coordination of resource sharing described herein can lead to an increase in data center performance and additionally can lead to an increase in density of workload elements without sacrificing performance.

Figure 2:
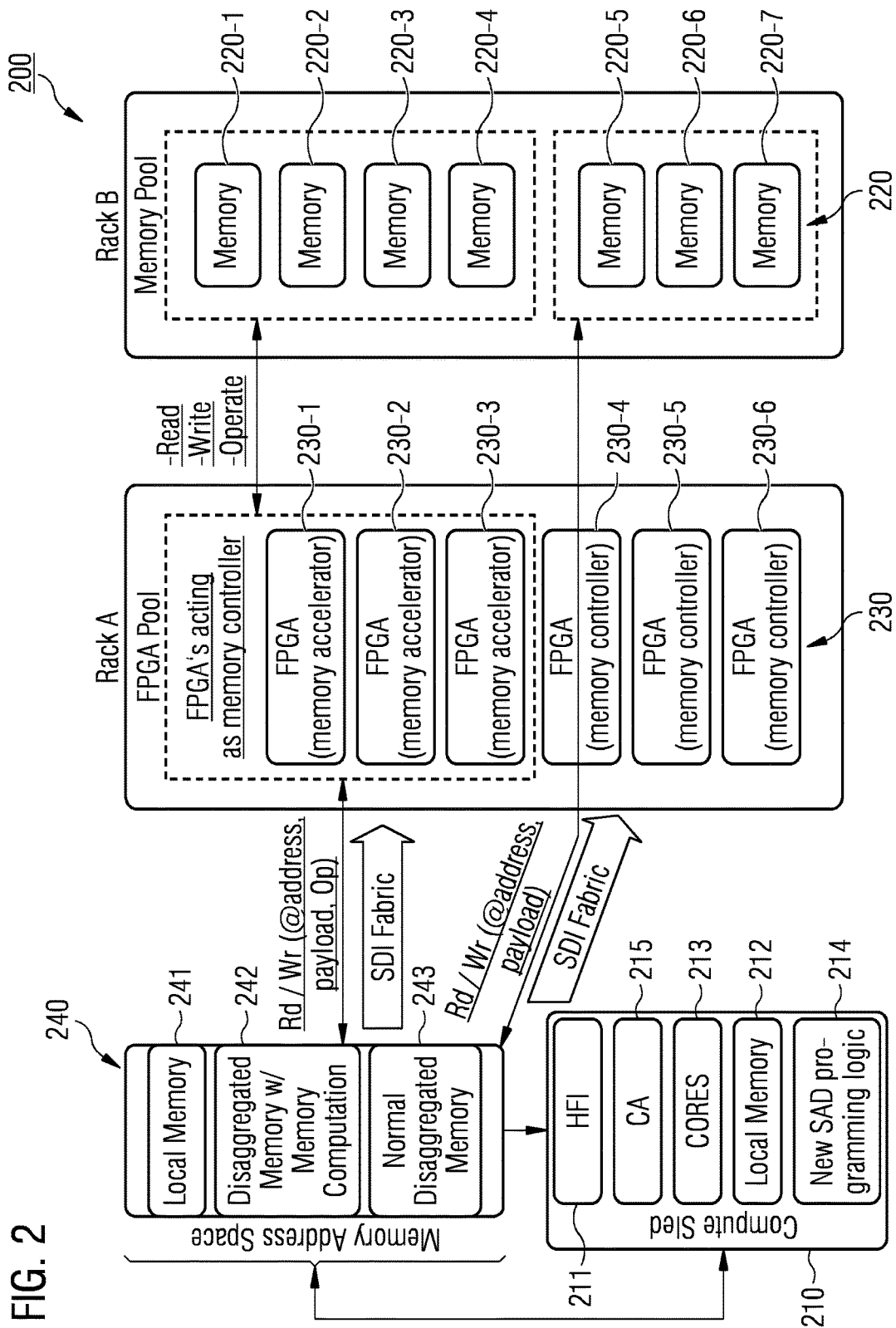
FIG. 2 illustrates an example of a composite computing node.

FIG. 2 shows an example of a composite computing node 200. The composite computing node 200, which may also be regarded as a logical server composed according to application specific requirements, comprises a compute sled 210, a plurality of disaggregated FPGAs 230, and a plurality of disaggregated memory modules 220. In the illustrated example, the plurality of disaggregated FPGAs 230 is housed in a different rack (A) than the plurality of disaggregated memory modules 220 (rack B). Note that the plurality of FPGAs 230 could also be located elsewhere, such as, for example, within the compute sled 210 or within the same rack as the plurality of disaggregated memory modules 220. This will be described further below.

The compute sled 210 comprises a host fabric interface (HFI) 211, one or more local memory components 212, one or more local CPUs 213, and a system address decoding (SAD) programming logic 214. The HFI 211 may be embodied as any communication interface, such as a network interface controller, communication circuit, device, or collection thereof, capable of enabling communications between the compute sled 210 and other remote computing hardware resources. The SAD logic may be part of a caching agent 215 which can be a circuit or a chipset embedded on a CPU core 213. The caching agent 215 can include an ingress to function as a gateway for a core-initiated request. The caching agent's ingress can be configured to receive a request from a CPU core 213 via an intra-die interconnect (IDI).

A memory address space 240 of the composite computing node 200 or an application running thereon can be divided into three address subspaces: a first memory address subspace 241 for local memory 212 of the compute sled 210, a second memory address subspace 242 for accelerated disaggregated memory, and a third memory address subspace 243 for non-accelerated disaggregated memory. Accelerated disaggregated memory can be composed of FPGAs 230-1, 230-2, 230-3 configured as memory acceleration logic (also referred to as memory accelerators) and associated with disaggregated memory modules 220-1, 220-2, 220-3, 220-4. Non-accelerated (normal) disaggregated memory can be composed of FPGAs 230-4, 230-5, 230-6 configured as conventional memory controller logic and associated with disaggregated memory modules 220-5, 220-6, 220-7. As mentioned before, the FPGAs 230-1, 230-2, 230-3 may be configured as memory acceleration logic to perform computations on and/or manipulations of data stored in one or more of the plurality of associated disaggregated memory modules 220-1, 220-2, 220-3, 220-4. Additionally, they can perform tasks of conventional memory controllers, such as read/write access, for example. Thus, the first memory address subspace 241 can be mapped to the compute sled's local memory 212. The second memory address subspace 242 can be mapped to the FPGAs 230-1, 230-2, 230-3, which can act as home for this address space and can expose interfaces to apply memory operations. The third memory address subspace 243 can be mapped to the FPGAs 230-4, 230-5, 230-6, these FPGAs can act as home for memory address subspace 243.

The SAD logic 214 can be configured to identify whether a memory request of an application addresses local memory 212 of the compute sled 210 (i.e., the first memory address subspace 241) or one or more accelerated disaggregated memory modules 220-1, 220-2, 220-3, 220-4 of the composite computing node 200 (i.e., the second memory address subspace 242). Of course, in the example setup of FIG. 2, the SAD logic 214 will also be configured to identify whether the memory request addresses one or more non-accelerated disaggregated memory modules 220-5, 220-6, 220-7 of the composite computing node 200 (i.e., the third memory address subspace 243). Thus, the SAD logic 214 can decode the memory address ranges within the request and redirect it to the proper home (disaggregated FPGAs 230-4, 230-5, 230-6 acting as memory controllers or FPGAs 230-1, 230-2, 230-3 acting as memory accelerators implementing the memory computation).

In some examples, the compute sled 210 or the SAD logic 214 thereof can be configured to transform or translate a physical memory address (e.g., represented in the form of a binary number on an address bus circuitry) of a memory request addressing an accelerated disaggregated memory module 220-1, 220-2, 220-3, 220-4 or an associated memory accelerator 230-1, 230-2, 230-3 to a virtual memory address (that an operating system makes available to a process) and to forward the memory request with the virtual memory address to the memory accelerator 230-1, 230-2, 230-3 associated with the addressed accelerated disaggregated memory module 220-1, 220-2, 220-3, 220-4. Thus, intra-die interconnect (IDI) and CPU to CPU interconnect (UPI) messages for memory requests targeting the second memory address subspace 242 can be extended with new fields to convey opcodes as well as parameters. On the other hand, the memory accelerators 230-1, 230-2, 230-3 can comprise logic configured to transform or translate a virtual memory address of a memory request to a corresponding physical memory address of a disaggregated memory module 220-1, 220-2, 220-3, 220-4 associated with the memory accelerator(s) 230-1, 230-2, 230-3, and vice versa.

Figure 3A:
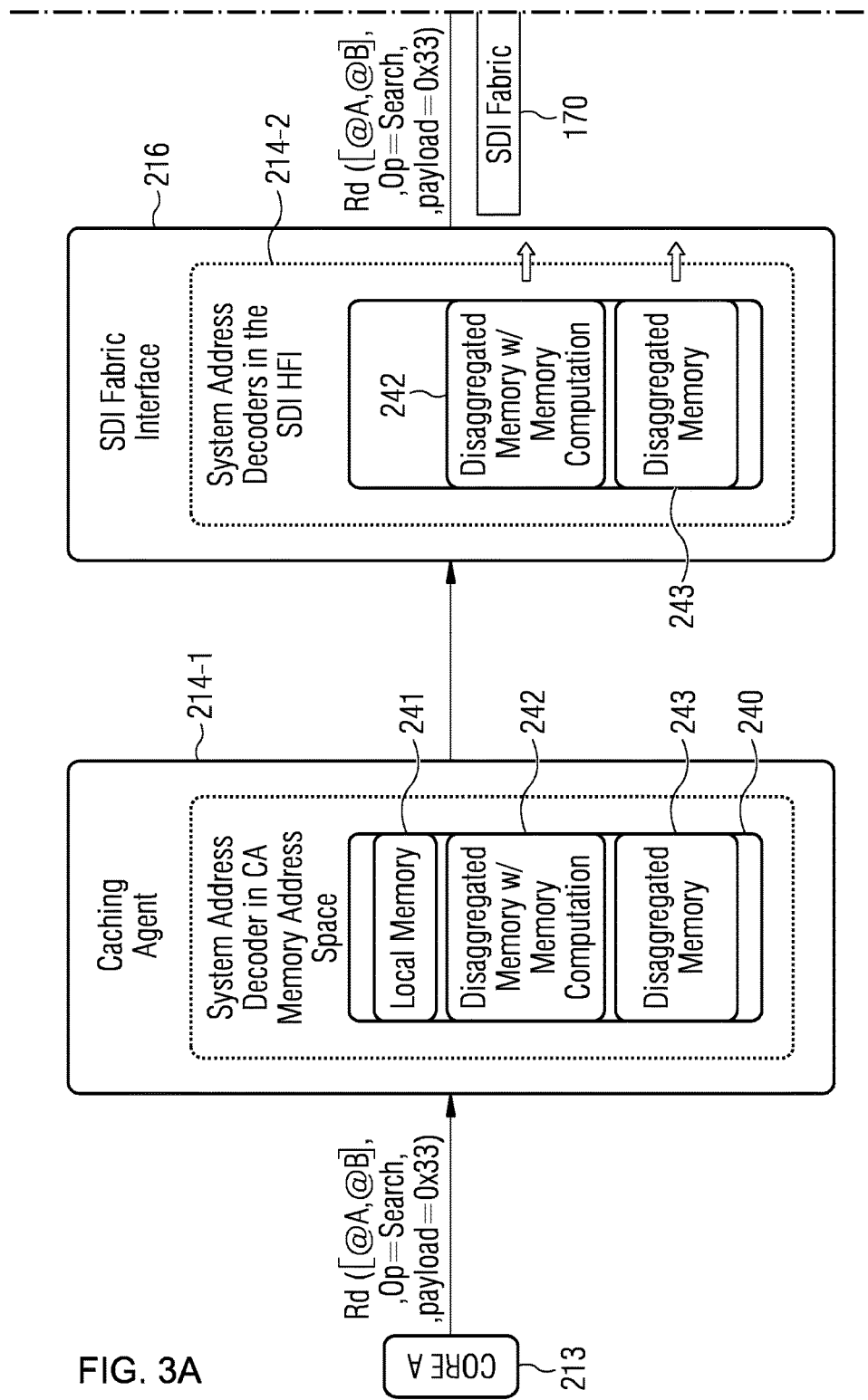
FIG. 3 shows an example of the proposed scheme.
Figure 3B:
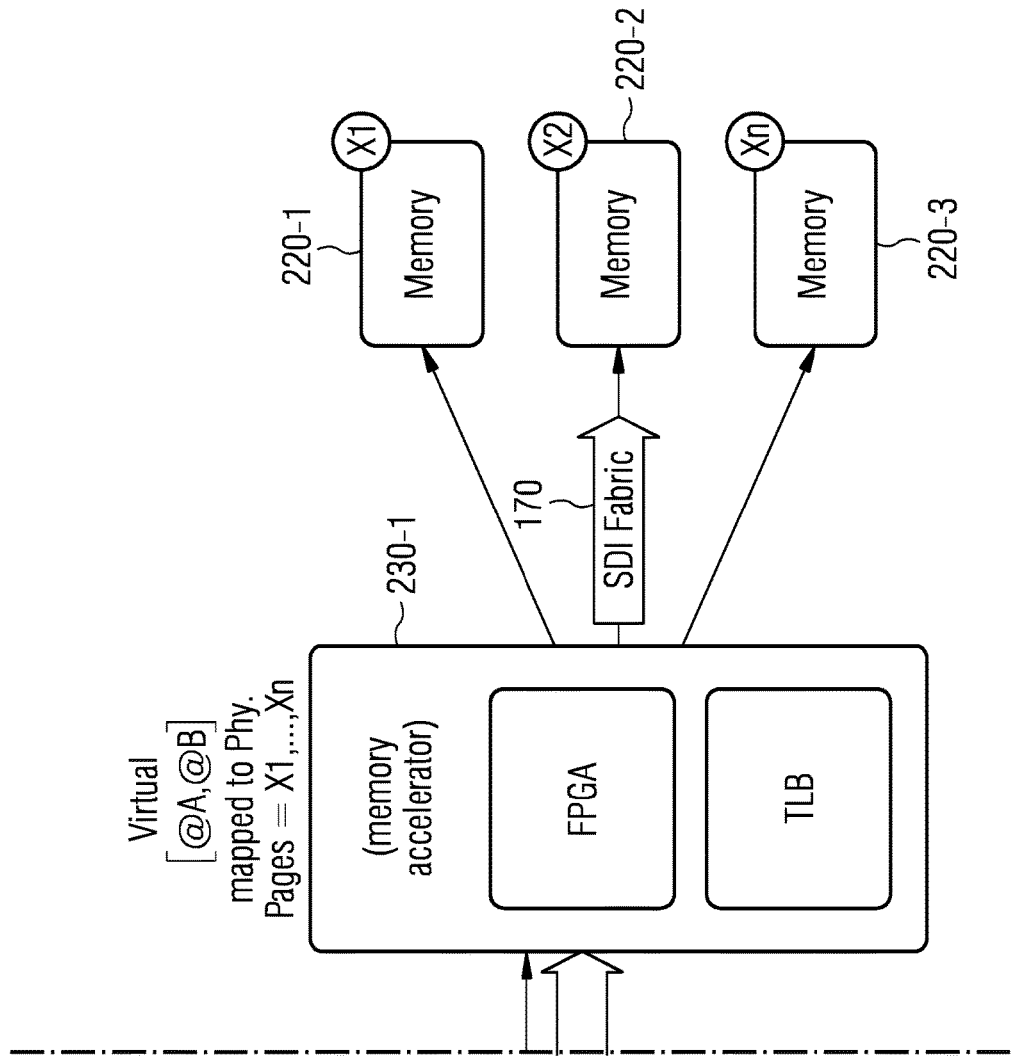

FIG. 3 depicts an example when an application running in processor core 213 (A) wants to perform a search operation of value 0x33 in a memory range (virtual) that is distributed among different pages stored in different DIMMs of the SDI architecture.

Here, a workflow or application running on processor core 213 wants to search 0x33 in virtual memory address range=[@A,@B] and issues a corresponding memory request, including an opcode for the search operation and the payload 0x33. In the illustrated example, the compute sled 210 or the caching agent 215 comprises a first level memory address decoder stage 214-1 which can be configured to identify whether the memory address range range=[@A, @B] of the memory request is mapped to local memory 212 of compute sled 210 or to disaggregated memory 220. If the memory address range range=[@A,@B] is mapped to disaggregated memory 220, the first level memory address decoder stage 214-1 can be configured to forward the memory request to a second level memory address decoder stage 214-2, which can be located in the HFI 211, for example. Thus, during first level decoding it can be identified whether a memory address is mapped to a disaggregated memory with or without memory computation/acceleration.

The second level memory address decoder stage 214-2 can be configured to identify whether the address range range=[@A,@B] of the memory request is mapped to accelerated disaggregated memory or to non-accelerated disaggregated memory. In case of accelerated disaggregated memory, it can be configured to forward the memory request to a memory accelerator 230-1 (e.g., an FPGA) associated with the accelerated disaggregated memory 220-1, 220-2, 220-3. In case of non-accelerated disaggregated memory, the second level memory address decoder 214-2 can be configured to forward the memory request to a memory controller associated with the non-accelerated disaggregated memory (not shown).

Thus, during second level decoding, the HFI 211 can identify which memory accelerator (e.g., FPGA) is the home for the given memory address range range=[@A,@B].

Once the memory request has been forwarded to memory accelerator 230-1, the latter can perform a translation lookaside buffer (TLB) walk to translate the virtual memory address range range=[@A,@B] to physical pages X1, X2, X3 and to where they are mapped (e.g. DIMMs in the sled 210, remote memory, etc.). Thereby, a TLB is a memory cache that can be used to reduce the time taken to access a user memory location. It can be a part of a memory accelerator's memory-management unit (MMU). The TLB can store the recent translations of virtual memory to physical memory and can be called an address-translation cache. The usage of virtual address spaces between the compute sleds and the accelerators can allow disaggregation of physical pages. Thus, with the proposed scheme, the acceleration can be implemented on top of virtual memory ranges that are distributed among physical pages hosted by different local or disaggregated memory resources.

After the virtual-to-physical translation, the memory accelerator 230-1 can fetch the pages, perform the memory operation specified in the memory request (here: search for 0x33) and return the result back to core 213. As mentioned before, other examples of computations/manipulations (also referred to as memory operations) include computing page level checksums (useful for non-volatile or persistent memory, to make sure data on a remote node is indeed what the application expects it to be, by comparing with an existing precomputed set of checksums), zeroing out pages, etc. That is to say, the memory accelerator 230-1, which can be disaggregated, can take over tasks which would normally have to be performed by the core 213.

Figure 4:
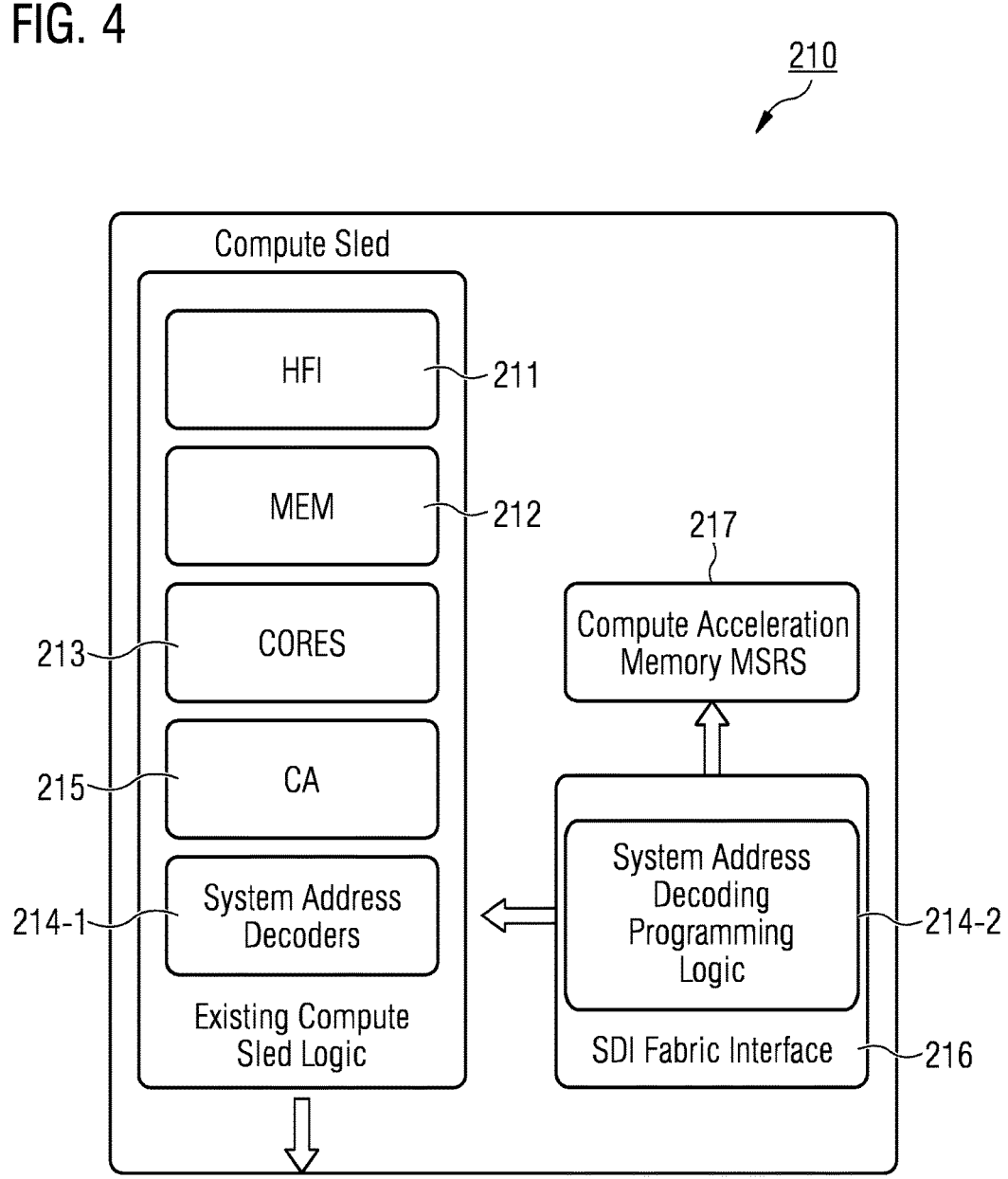
FIG. 4 shows a block diagram of a compute sled according to an example.
Figure 5:
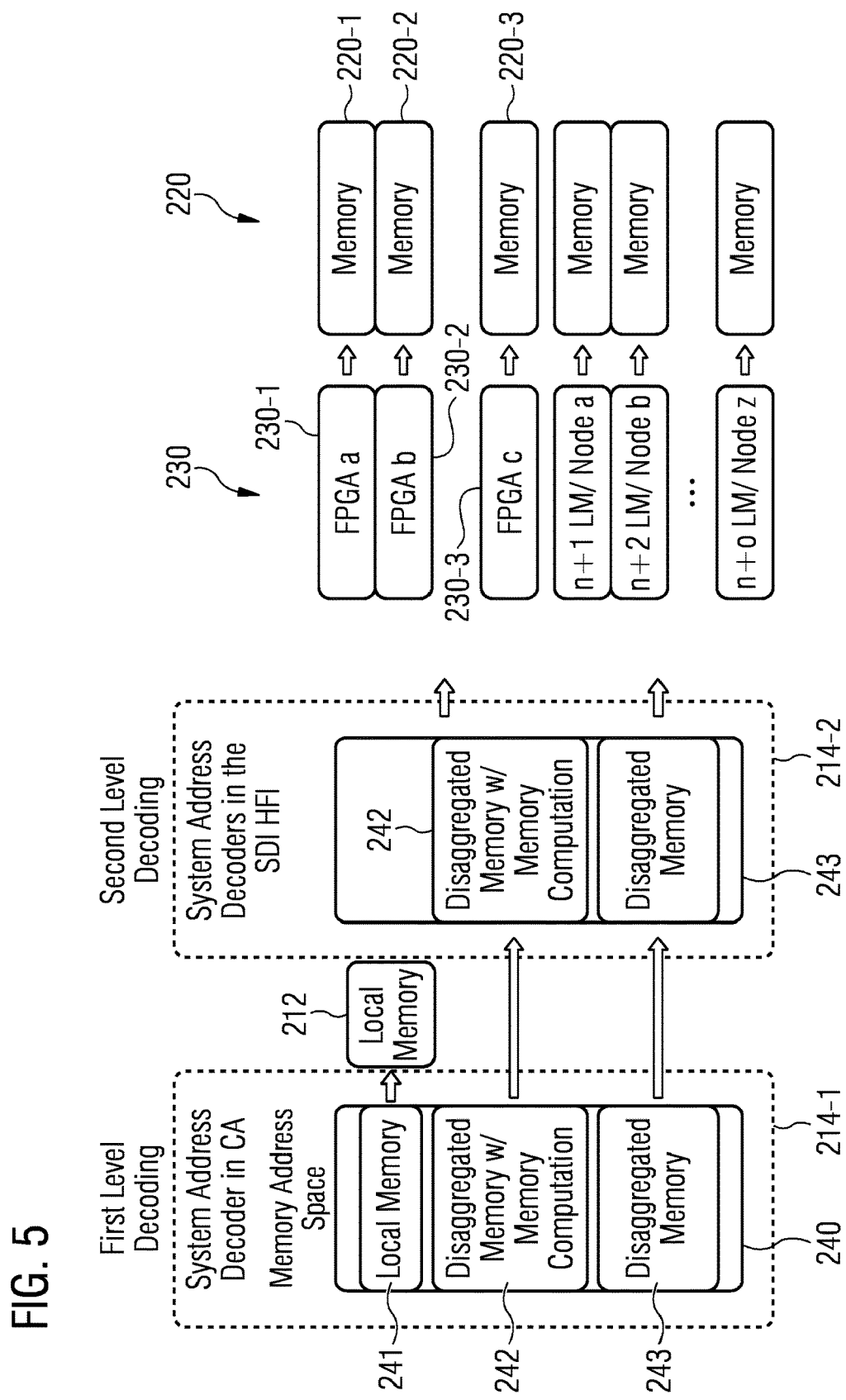
FIG. 5 shows an example of the proposed system address decoding scheme.

FIG. 4 shows a block diagram of a compute sled 210 according to an example of the present disclosure. As depicted in FIG. 5 and already explained with regard to FIG. 3, a new address space 242 can be used in the SADs 214-1 of the caching agents (CA) 215. address space 242 is mapped to memory 220-1, 220-2, 220-3 that supports memory acceleration by memory accelerators (e.g., disaggregate FPGAs) 230-1, 230-2, 230-3. This can be referred to as the first level of system address decoding. The CA 215 or the first level memory decoder 214-1 thereof can identify that the address subspace 242 is mapped to the SDI Fabric 170. The SDI fabric interface 216 (connecting the compute sled 210 to the fabric 170) can be extended with a second level system address decoder 214-2 that can decode the memory address ranges within the request and redirect it to the proper home (disaggregated memory controller(s) or memory accelerator(s) implementing the memory computation). This can be referred to as the second level of system address decoding. Here, the request coming from the CA 215 can be decoded and the FGPA acting as a home for the request can be identified and the request can be forwarded. The SDI fabric interface 216 can translate physical addresses to virtual address before sending the request to the FPGA.

The SDI fabric interface 216 can optionally be extended with a logic that is responsible to do error detection check in the data returned by the FGPA. In other words, the compute sled 210 or the SDI fabric interface 216 thereof can comprise an error detector configured to perform error correction/detection decoding of data received from the at least one disaggregated memory accelerator. Correspondingly, the at least one disaggregated memory accelerator can comprise an FEC encoder configured to perform forward error correction encoding of data to be transmitted to the compute sled 210. The data correction algorithms supported (such as Error Correcting Code, ECC) by the architecture can depend on the product. Both FGPA 230 and compute sled 210 need to be coordinated in what type of data correction algorithm is used.

The IDI and UPI messages (not shown in the drawings) for memory requests targeting the second memory address subspace 242 can be extended with fields to convey opcodes as well as parameters defining the memory computations. An opcode (abbreviated from operation code, also known as instruction syllable or opstring) may be understood as the portion of a machine language instruction that specifies the operation to be performed. Alternatively, in case IDI and UPI messages cannot be extended, the new interfaces could be provided by memory-mapped I/O (MMIO). MMIO uses the same address space to address both memory and I/O devices. The memory and registers of the I/O devices are mapped to (associated with) address values. So when an address is accessed by the CPU, it may refer to a portion of physical RAM, but it can also refer to memory of the I/O device. Thus, the CPU instructions used to access the memory can also be used for accessing devices. Requests with memory accelerations semantics can only be directed to an address space with memory acceleration support. Otherwise a fault can be generated back to the application.

These ranges as well as the characteristics of the accelerated address spaces 242 available within a composite computing node (memory operations supported, parameters, returned values etc.) can be exposed to a software stack via a set of control registers 217 (e.g. model-specific registers, (MSRs)). Thus, the compute sled 210 can comprise at least one control register 217 which may be accessible by the resource manager module 140. The resource manager module 140 can be configured to store a (virtual) memory address range corresponding to at least one selected accelerated disaggregated memory module of the composite computing node in the at least one control register 217. Further, the resource manager module 140 can be configured to store information on the one or more predefined computations supported by the at least one disaggregated memory accelerator in the at least one control register 217, for example during assembly of the composite node. Thus, after the composite computing node 200 is composed or assembled, the operating system can discover during boot time what compute acceleration schemes are available in the composite computing node. Here the operating system can access to the set of control registers 217 with the following information:
  address range
  list of memory operations.
  per each of memory operation it can discover semantics
    parameters and returned values.

In some examples, the SDI Fabric 170 can be extended in order to allow sending memory operations over fabric conveying information with memory computation/acceleration semantics. These messages can be used by the SDI Fabric Interface 216 in the compute sled 210 as well as the memory accelerators 230 to send memory acceleration requests as well as their results.

Figure 6:
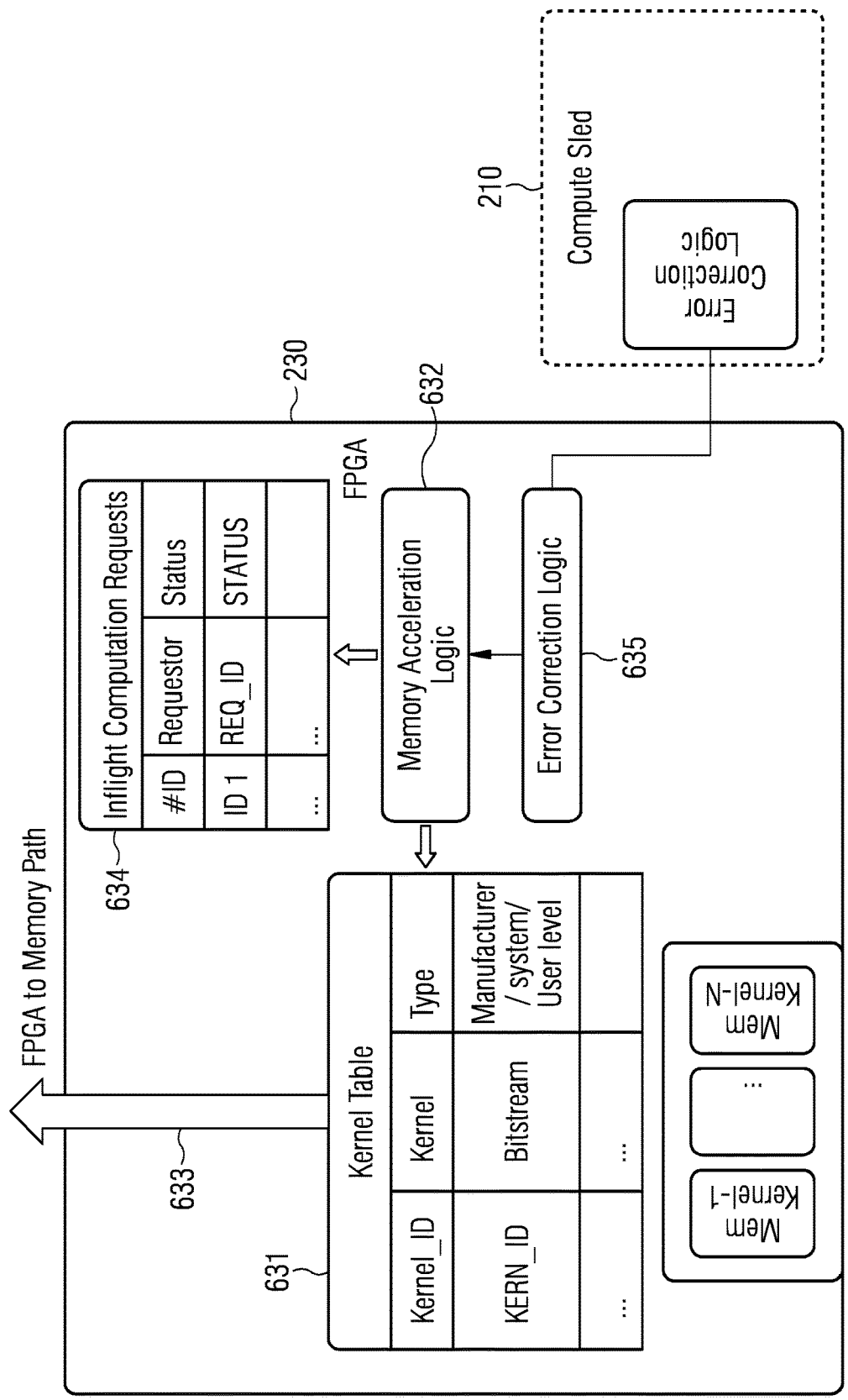
FIG. 6 illustrates an example Field Programmable Gate Array (FPGA) architecture.

As depicted in the example of FIG. 6, a memory accelerator 230 (FPGA in the illustrated example) can include memory or storage 631 configured to store program code implementing the one or more predefined memory computations. In particular, the memory or storage 631 can include a kernel table containing one or more different bit-streams implementing one or more different memory operations. Each bit-stream can contain a kernel ID, the bit-stream as well as other meta-data that can be used to deploy the bit-stream in the memory accelerator (e.g., FPGA) 230.

The memory accelerator 230 can include memory acceleration logic (MAL) 632 that is responsible to manage bit-streams (program code) registered from the resource manager 140 as well as manage requests coming from the compute sleds 210. New memory acceleration requests can be allocated to inflight requests 634 and can create a new instance of the corresponding bit-stream in to the FPGA programmable logic. The MAL 632 can be responsible to check that the bit-stream does not fail as well as returning the result to the requestor once the operation is finished.

The memory accelerator 230 can have a connection or interface 633 to the disaggregated memory. This connection 633 can be a direct path or simply though the SDI Fabric 170 and it can be used by the bit-streams to fetch and write data to disaggregated memory 220 in order to execute the operation implemented by these bit-streams.

As has been described before, the memory accelerator 230 can contain a TLB that is used to translate the virtual address range sent by the compute sled 210 to a set of physical pages. These physical pages can be fetched or modified by the memory accelerator 230 to perform the operation. A virtual address can be provided to the memory accelerator 230 because a virtual address rage may be divided in multiple and non-contiguous physical pages mapped to multiple disaggregated memories.

As has been mentioned before, the memory accelerator 230 can contain a logic 635 that can be responsible to add reliability data (such as Error Correcting Code, ECC) to the data returned to the compute sled 210. The algorithm used by the memory accelerator 230 can depend on the actual product.

The resource manager module 140 can also comprise one or more interfaces to the orchestrator 180 to register the memory computation functions exposed by each address space/accelerator, their characteristics (e.g., semantic, operators, parameters etc.). In other words, the resource manager module 140 may be further configured to provide information on the one or more predefined computations supported by the at least one disaggregated memory accelerator to the orchestrator 180. This information can be used as requirements of an application when composing a composite computing node. Furthermore, it can get exposed to the software stack through the control registers 217 once the composite computing node is assembled.

Figure 7A:
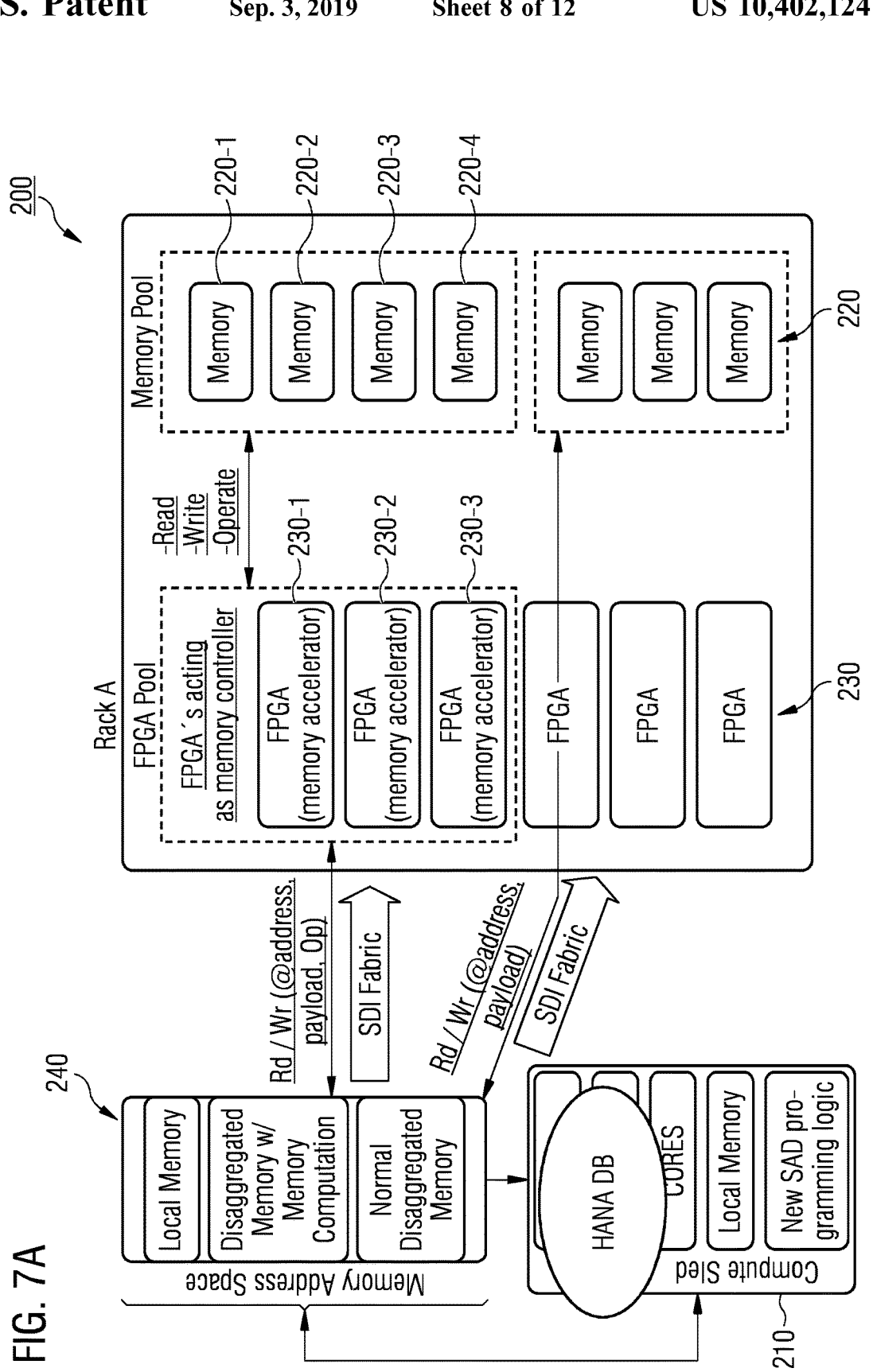
FIGS. 7A-C shows different deployment examples.
Figure 7B:
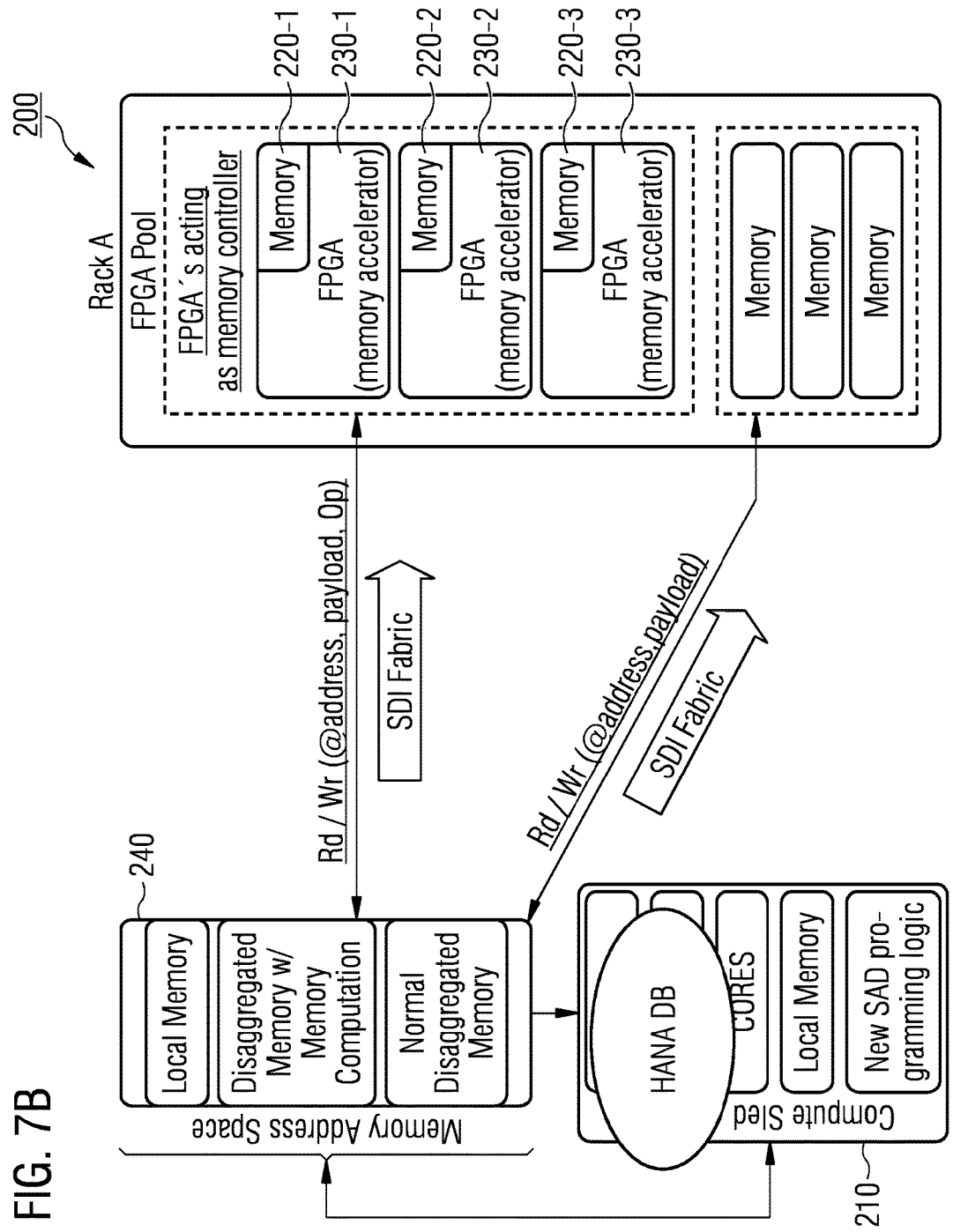
Figure 7C:
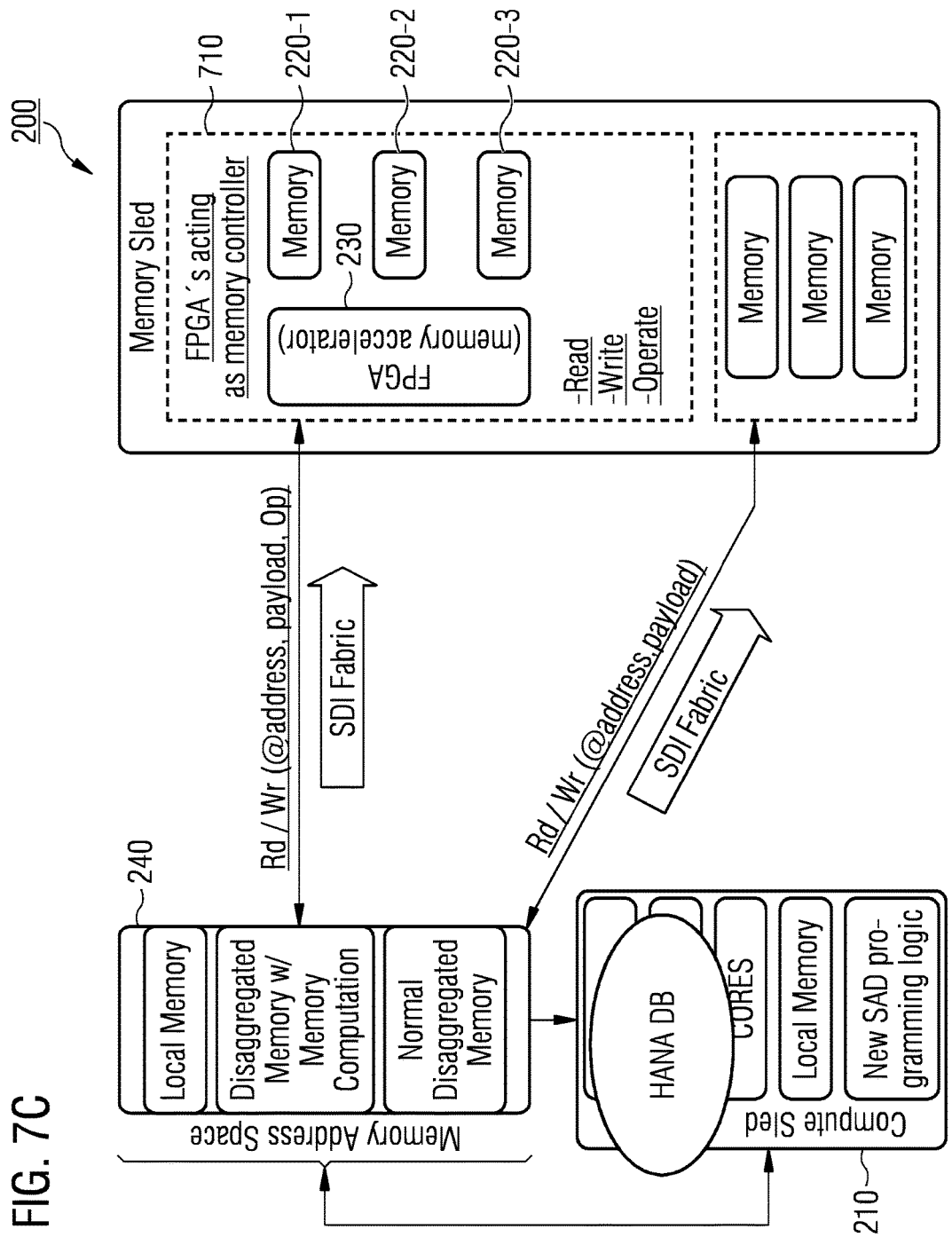

As has been mentioned before, the principles of the present disclosure can be deployed in multiple forms. While the previous figures referred to example scenarios where the memory is housed in a different rack than the accelerators, FIGS. 7A-C depict different example setups of composite computing nodes 200 where memory and accelerators are housed within the same rack. FIG. 7A differs from FIG. 2 in that the memory accelerators/controllers (e.g., FPGAs) 230 are located within the same rack as the memory modules 220, which can lead to less latency compared to the scenario of FIG. 2. FIG. 7B differs from the configuration of FIG. 7A in that the accelerated memory modules 220 are housed within the memory accelerators 230. Said differently, here, the at least one disaggregated memory accelerator 230 comprises at least one associated disaggregated memory module 220. The skilled person having benefit from the present disclosure will appreciate that this setup can reduce latency even more. In the example of FIG. 7C, accelerated memory modules 220 and at least one associated memory accelerator 230 are housed within the same memory sled 710, which could, for example, be the same rack drawer or another common platform, such as a PCB, for example.

The skilled person having benefit from the present disclosure will appreciate that the apparatuses and systems described before can be configured to carry a method for dynamically composing a composite computing node in accordance with requirements of an application to be executed on the composite computing node. An example of such a method 800 is illustrated in FIG. 8.

The method 800 includes providing 810 at least one compute sled including a set of respective local computing hardware resources, providing 820 a plurality of disaggregated memory modules, providing 830 at least one disaggregated memory acceleration logic configured to perform one or more predefined computations on data stored in one or more of the plurality of disaggregated memory modules, and assembling 840 a composite computing node by associating, in accordance with (workload) requirements of a user, at least one of the plurality of disaggregated memory modules with the disaggregated memory acceleration logic to provide at least one accelerated disaggregated memory module and connecting the least one accelerated disaggregated memory module to the compute sled. In some examples, the method 800 can be used to assemble a composite computing node (logical server) from pools of disaggregated hardware computing resources of a data center.

To summarize, the present disclosure proposes to extend the SDI Architecture in order to expose a new type of memory address space that allows access to disaggregated memory through memory acceleration/computation. It allows disaggregated memory to perform a memory computation to a memory range and return the result of the operation and store the result of the operation to a given memory address. It allows discovery what type of memory computation operations are supported by specific "accelerated" disaggregated memories in the architecture. Using this interface, applications running in the SDI architecture can dynamically discover what other nodes support with regards to memory computation enhancements. This functionality can be implemented by the SDI manager.

To implement the previous features, at high level, the present disclosure proposes a new address space in the system address decoders of the caching agents is that is mapped to disaggregated memory that supports acceleration. The IDI and UPI messages for memory requests targeting this new address space are extended with new fields to convey opcodes as well as parameters. New system address decoders are proposed that decode the memory address ranges within the request and redirects it to the proper home (disaggregated memory controllers or accelerator implementing the memory computation). It is proposed to extend the SDI architecture with new type of elements "the memory compute accelerators" preferably placed nearby the disaggregated memory and carrying out the memory acceleration/ computation. The memory accelerators (e.g., FPGAs) allow registering memory computation algorithms (that can be registered anytime) as well as the logic to manager requests coming from the compute sleds. The memory compute accelerators (e.g., FPGAs) and the compute sled can be extended with logic that implements data correction algorithms. The resource manager module can be extended with new interfaces to register what are the memory computation functions exposed by each address space/accelerator, their characteristics (semantic, operators, parameters etc.).

Figure 9:
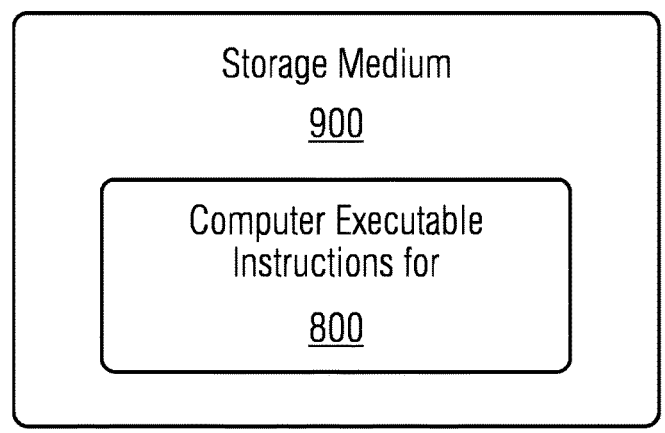
FIG. 9 illustrates an example of a storage medium.

FIG. 9 illustrates an example storage medium 900. As shown in FIG. 9, the storage medium includes a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
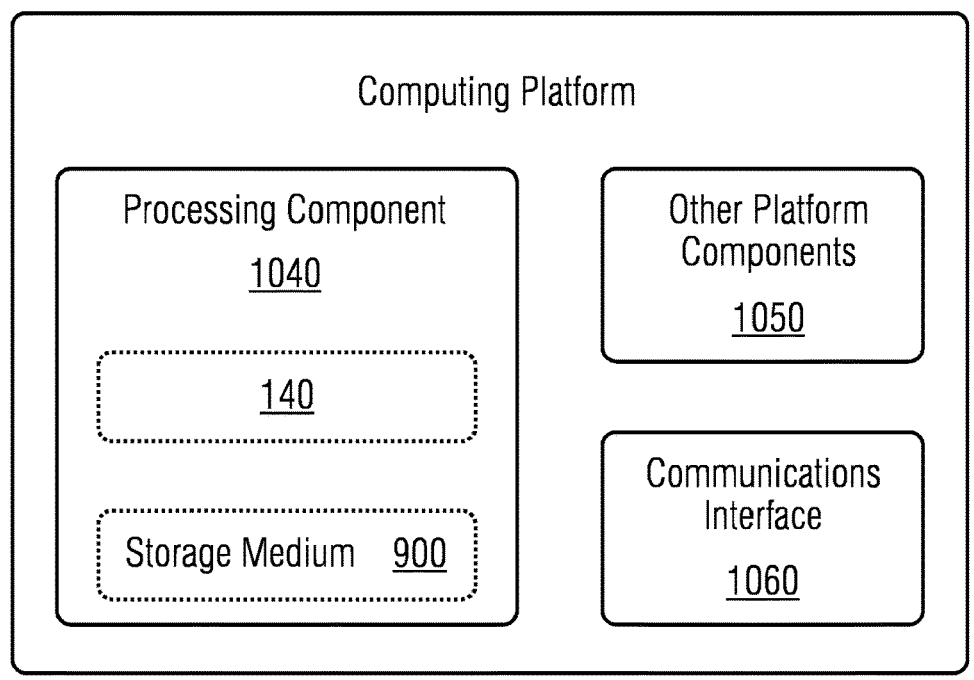
FIG. 10 illustrates an example of a computing platform.

FIG. 10 illustrates an example computing platform 1000. In some examples, as shown in FIG. 10, computing platform 1000 may include a processing component 1040, other platform components 1050 or a communications interface 1060. According to some examples, computing platform 1000 may host management elements (e.g., cloud infrastructure orchestrator, network data center service chain orchestrator, or the like) providing management functionality for a system having a shared pool of configurable computing resources such as system 100 of FIG. 1, for example. Computing platform 1000 may either be a single physical server or a composed logical server that includes combinations of disaggregate components or elements composed from a shared pool of configurable computing resources.

According to some examples, processing component 1040 may execute processing operations or logic for resource manager 140 and/or storage medium 900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

As mentioned above computing platform 1000 may be implemented in a single server or a logical server made up of composed disaggregate components or elements for a shared pool of configurable computing resources. Accordingly, functions and/or specific configurations of computing platform 1000 described herein, may be included or omitted in various embodiments of computing platform 1000, as suitably desired for a physical or logical server.

The components and features of computing platform 1000 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The following examples pertain to further embodiments.

Example 1 is a computing system comprising at least one compute sled including a set of respective local computing hardware resources, a plurality of disaggregated memory modules, at least one disaggregated memory acceleration logic configured to perform one or more predefined computations on data stored in one or more of the plurality of disaggregated memory modules, and a resource manager module configured to assemble a composite computing node by association, in accordance with requirements of a user, of at least one of the plurality of disaggregated memory modules with the disaggregated memory acceleration logic to provide at least one accelerated disaggregated memory module and connect the least one accelerated disaggregated memory module to the compute sled.

In Example 2, the plurality of disaggregated memory modules of Example 1 can be optionally located remotely from the at least one compute sled and/or wherein the at least one disaggregated memory acceleration logic is located remotely from the at least one compute sled.

In Example 3, the plurality of disaggregated memory modules of Example 2 can be optionally located in a different rack drawer or rack than the at least one compute sled and/or wherein the at least one disaggregated memory acceleration logic is located in a different rack drawer or rack than the at least one compute sled.

In Example 4, the one or more of the plurality of disaggregated memory modules associated with the at least one disaggregated memory acceleration logic of any one of the previous Examples can be optionally located in the same rack drawer or rack as the at least one disaggregated memory acceleration logic.

In Example 5, the plurality of disaggregated memory modules, the least one disaggregated memory acceleration logic and the at least one compute sled of any one of the previous Example can optionally be connected via a computing fabric.

In Example 6, the local computing hardware resources of the compute sled of any one of the previous Examples can optionally comprise one or more local CPUs and one or more local memory modules.

In Example 7, the compute sled of any one of the previous Examples can optionally comprise a memory address decoder configured to identify whether a memory request addresses a local memory module of the compute sled or an accelerated disaggregated memory module of the composite computing node.

In Example 8, the compute sled of Example 7 can optionally be configured to translate a physical memory address of a memory request addressing an accelerated disaggregated memory module to a virtual memory address and to forward the memory request with the virtual memory address to a disaggregated memory acceleration logic associated with the addressed accelerated disaggregated memory module.

In Example 9, the at least one disaggregated memory acceleration logic of any one of the previous Examples can optionally comprise logic configured to translate a virtual memory address of a memory request to a corresponding physical memory address of a disaggregated memory module associated with the disaggregated memory acceleration logic.

In Example 10, the compute sled of any one of the previous Examples can optionally comprise at least one control register and wherein the resource manager module is configured to store a memory address range corresponding to at least one selected accelerated disaggregated memory module of the composite computing node in the at least one control register.

In Example 11, the resource manager module of Example 10 can further optionally be configured to store information on the one or more predefined computations supported by the at least one disaggregated memory acceleration logic in the at least one control register.

In Example 12, the at least one disaggregated memory acceleration logic of any one of the previous Examples can optionally include memory or storage configured to store program code implementing the one or more predefined computations.

In Example 13, the at least one disaggregated memory acceleration logic of any one of the previous Examples can optionally be configured to fetch the data from the one or more of the plurality of disaggregated memory modules, to perform the one or more predefined computations using the fetched data, and to provide a result of the one or more predefined computations to a user.

In Example 14, the at least one disaggregated memory acceleration logic of any one of the previous Examples can optionally be a field programmable gate array.

In Example 15, the plurality of accelerated disaggregated memory modules and the at least one associated disaggregated memory acceleration logic of any one of the previous Examples can optionally be installed within a same rack.

In Example 16, the disaggregated memory acceleration logic of any one of the previous Examples can optionally include at least one associated disaggregated memory module.

Example 17 is a data center comprising a first rack housing at least one compute sled including a set of respective local computing hardware resources, at least a second rack to house a plurality of disaggregated memory modules associated with at least one memory acceleration logic configured to perform one or more predefined computations on data stored in one or more of the plurality of disaggregated memory modules, a resource manager circuit configured to assemble a composite computing node via allocation, in accordance with computing requirements of an application to be executed on the composite computing node, of at least one of the disaggregated memory modules associated with the at least one memory acceleration logic to the at least one compute sled.

In Example 18, the data center of Example 17 can further optionally comprise a third rack to house a plurality of non-accelerated disaggregated memory modules, wherein the resource manager module is configured to assemble the composite computing node via allocation, in accordance with the computing requirements, of at least one non-accelerated disaggregated memory module to the at least one compute sled.

Example 19 is a method of composing a composite computing node in accordance with requirements of an application to be executed on the composite computing node. The method includes providing at least one compute sled including a set of respective local computing hardware resources, providing a plurality of disaggregated memory modules, providing at least one disaggregated memory acceleration logic configured to perform one or more predefined computations on data stored in one or more of the plurality of disaggregated memory modules, and assembling a composite computing node by associating, in accordance with requirements of a user, at least one of the plurality of disaggregated memory modules with the disaggregated memory acceleration logic to provide at least one accelerated disaggregated memory module and connecting the least one accelerated disaggregated memory module to the compute sled.

In Example 20, method of Example 19 can further optionally comprise decoding a memory request from the application as to whether it relates to a local memory module of the compute sled or to an accelerated disaggregated memory module of the composite computing node, and in case the memory request relates to an accelerated disaggregated memory module of the composite computing node, forwarding the memory request from the compute sled to a disaggregated memory acceleration logic associated with the accelerated disaggregated memory module.

In Example 21, forwarding the memory request of Example 21 can further optionally comprise translating a physical memory address of the memory request to a virtual memory address and forwarding the memory request with the virtual memory address to the disaggregated memory acceleration logic.

In Example 22, the method of Example 21 can further optionally comprise translating, in the disaggregated memory acceleration logic, the forwarded virtual memory address to a physical memory address of an accelerated disaggregated memory module associated with the at least one disaggregated memory acceleration logic.

In Example 23, the method of any one of Examples 20 to 22 can further optionally comprise performing, using the disaggregated memory acceleration logic, a memory computation specified in the memory request.

In Example 24, the method of any one of Examples 20 to 23 can further optionally comprise storing a memory address range of the at least one selected accelerated disaggregated memory module of the composite computing node in at least one control register of the compute sled.

In Example 25, the method of Example 24 can further optionally comprise storing information on the one or more predefined computations supported by the at least one disaggregated memory acceleration logic in the at least one control register.

In Example 26, the method of any one of Examples 19 to 25 can further optionally comprise storing program code implementing the one or more predefined computations in the at least one disaggregated memory acceleration logic.

In Example 27, the method of any one of Examples 19 to 26 can further optionally comprise providing the plurality of accelerated disaggregated memory modules and the at least one associated disaggregated memory acceleration within a same rack or rack drawer.

Example 28 is computer program product comprising a non-transitory computer readable medium having computer readable program code embodied therein, wherein the computer readable program code, when being loaded on a computer, a processor, or a programmable hardware component, is configured to compose a composite computing node in accordance with requirements of an application to be executed on the composite computing node, composing to include: assembling a composite computing node by associating, in accordance with requirements of a user, at least one of a plurality of disaggregated memory modules with at least one disaggregated memory accelerator configured to perform one or more predefined computations on data stored in one or more of the plurality of disaggregated memory modules to provide at least one accelerated disaggregated memory module and connecting the least one accelerated disaggregated memory module to the compute sled.

In Example 29, the computer readable program code of Example 28, when being loaded on a computer, a processor, or a programmable hardware component, is further configured to decode a memory request from the application as to whether it relates to a local memory module of the compute sled or to an accelerated disaggregated memory module of the composite computing node, and in case the memory request relates to an accelerated disaggregated memory module of the composite computing node, forward the memory request from the compute sled to a disaggregated memory accelerator associated with the accelerated disaggregated memory module.

What is claimed is:

1. A system, comprising:
   at least one compute sled including a set of respective local computing hardware resources;
   a plurality of disaggregated memory modules;
   at least one disaggregated memory acceleration logic configured to perform one or more predefined computations on data stored in one or more of the plurality of disaggregated memory modules; and
   a resource manager module configured to assemble a composite computing node by association, in accordance with requirements of a user, of at least one of the plurality of disaggregated memory modules with the disaggregated memory acceleration logic to provide at least one accelerated disaggregated memory module and connect the least one accelerated disaggregated memory module to the compute sled.

2. The system of claim 1, wherein the plurality of disaggregated memory modules is located remotely from the at least one compute sled and/or wherein the at least one disaggregated memory acceleration logic is located remotely from the at least one compute sled.

3. The system of claim 2, wherein the plurality of disaggregated memory modules is located in a different rack drawer or rack than the at least one compute sled and/or wherein the at least one disaggregated memory acceleration logic is located in a different rack drawer or rack than the at least one compute sled.

4. The system of claim 1, wherein one or more of the plurality of disaggregated memory modules associated with the at least one disaggregated memory acceleration logic are located in the same rack drawer or rack as the at least one disaggregated memory acceleration logic.

5. The system of claim 1, wherein the plurality of disaggregated memory modules, the least one disaggregated memory acceleration logic and the at least one compute sled are connected via a computing fabric.

6. The system of claim 1, wherein the local computing hardware resources of the compute sled comprise one or more local CPUs and one or more local memory modules.

7. The system of claim 1, wherein the compute sled comprises a memory address decoder configured to identify whether a memory request addresses a local memory module of the compute sled or an accelerated disaggregated memory module of the composite computing node.

8. The system of claim 7, wherein the compute sled is configured to translate a physical memory address of a memory request addressing an accelerated disaggregated memory module to a virtual memory address and to forward the memory request with the virtual memory address to a disaggregated memory acceleration logic associated with the addressed accelerated disaggregated memory module.

9. The system of claim 1, wherein the at least one disaggregated memory acceleration logic comprises logic configured to translate a virtual memory address of a memory request to a corresponding physical memory address of a disaggregated memory module associated with the disaggregated memory acceleration logic.

10. The system of claim 1, wherein the compute sled comprises at least one control register and wherein the resource manager module is configured to store a memory address range corresponding to at least one selected accelerated disaggregated memory module of the composite computing node in the at least one control register.

11. The system of claim 10, wherein the resource manager module is further configured to store information on the one or more predefined computations supported by the at least one disaggregated memory acceleration logic in the at least one control register.

12. The system of claim 1, wherein the at least one disaggregated memory acceleration logic includes memory or storage configured to store program code implementing the one or more predefined computations.

13. The system of claim 1, wherein the at least one disaggregated memory acceleration logic is configured to fetch the data from the one or more of the plurality of disaggregated memory modules, to perform the one or more predefined computations using the fetched data, and to provide a result of the one or more predefined computations to a user.

14. The system of claim 1, wherein the at least one disaggregated memory acceleration logic is a field programmable gate array.

15. The system of claim 1, wherein the plurality of accelerated disaggregated memory modules and the at least one associated disaggregated memory acceleration logic are installed within a same rack.

16. The system of claim 1, wherein the disaggregated memory acceleration logic includes at least one associated disaggregated memory module.

17. A data center, comprising:
a first rack housing at least one compute sled including a set of respective local computing hardware resources;
at least a second rack to house a plurality of disaggregated memory modules associated with at least one memory acceleration logic configured to perform one or more predefined computations on data stored in one or more of the plurality of disaggregated memory modules;
a resource manager circuit configured to assemble a composite computing node via allocation, in accordance with computing requirements of an application to be executed on the composite computing node, of at least one of the disaggregated memory modules associated with the at least one memory acceleration logic to the at least one compute sled.

18. The data center of claim 17, further comprising a third rack to house a plurality of non-accelerated disaggregated memory modules, wherein the resource manager module is configured to assemble the composite computing node via allocation, in accordance with the computing requirements, of at least one non-accelerated disaggregated memory module to the at least one compute sled.

19. A method comprising:
composing a composite computing node in accordance with requirements of an application to be executed on the composite computing node, composing to include:
providing at least one compute sled including a set of respective local computing hardware resources;
providing a plurality of disaggregated memory modules;
providing at least one disaggregated memory acceleration logic configured to
perform one or more predefined computations on data stored in one or more of
the plurality of disaggregated memory modules; and
assembling a composite computing node by associating, in accordance with requirements of a user, at least one of the plurality of disaggregated memory modules with the disaggregated memory acceleration logic to provide at least one accelerated disaggregated memory module and connecting the least one accelerated disaggregated memory module to the compute sled.

20. The method of claim 19, further comprising
decoding a memory request from the application as to whether it relates to a local memory module of the compute sled or to an accelerated disaggregated memory module of the composite computing node, and
in case the memory request relates to an accelerated disaggregated memory module of the composite computing node,
forwarding the memory request from the compute sled to a disaggregated memory acceleration logic associated with the accelerated disaggregated memory module.

21. The method of claim 20, wherein forwarding the memory request comprises translating a physical memory address of the memory request to a virtual memory address and forwarding the memory request with the virtual memory address to the disaggregated memory acceleration logic.

22. The method of claim 21, further comprising,
translating, in the disaggregated memory acceleration logic, the forwarded virtual memory address to a physical memory address of an accelerated disaggregated memory module associated with the at least one disaggregated memory acceleration logic.

23. The method of claim 20, further comprising
performing, using the disaggregated memory acceleration logic, a memory computation specified in the memory request.

24. The method of claim 19, further comprising
storing a memory address range of the at least one selected accelerated disaggregated memory module of the composite computing node in at least one control register of the compute sled.

25. The method of claim 24, further comprising storing information on the one or more predefined computations supported by the at least one disaggregated memory acceleration logic in the at least one control register.

* * * * *